April 7, 1931.  A. C. RECKER  1,799,246
METALLIC PACKING RING FOR SLIP JOINT PIPE CONNECTIONS
Filed July 26, 1927
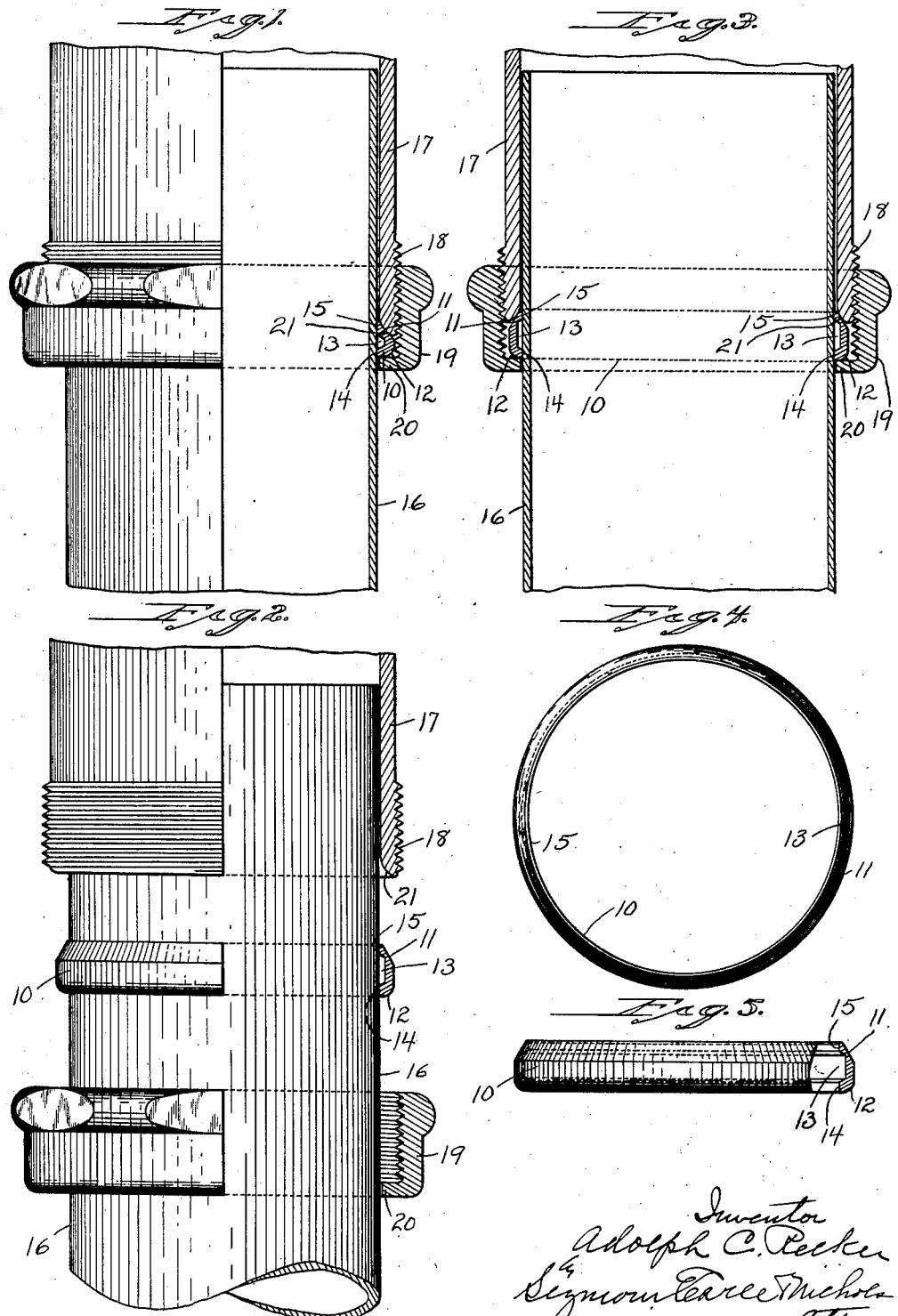

Patented Apr. 7, 1931

1,799,246

UNITED STATES PATENT OFFICE

ADOLPH C. RECKER, OF OAKVILLE, CONNECTICUT, ASSIGNOR TO CHASE COMPANIES, INC., OF WATERBURY, CONNECTICUT, A CORPORATION

METALLIC PACKING RING FOR SLIP-JOINT PIPE CONNECTIONS

Application filed July 26, 1927. Serial No. 208,462.

This invention relates to an improvement in packing-rings and particularly to packing-rings for slip-joint pipe connections.

Heretofore, in slip-joint pipe connections, it has generally been the custom to employ packing-rings composed of lead or other soft metal which, however, while capable of producing a tight joint, if uninjured, are inherently weak and susceptible to bending and distortion in shipment and in handling. The results to be expected from the use of such soft metal packing-rings are, therefore, more or less uncertain, as any distortion is extremely difficult to correct without the use of special tools. Non-metallic packing-rings formed of such materials as rubber or leather are, of course, not as long-lived as those made of metal and, for that reason, are not to be compared with the latter.

The object of this invention is to produce, at a low cost for manufacture, a packing-ring capable of producing a leak-proof joint and which, at the same time, possesses sufficient strength and rigidity to effectively resist bending and distortion in shipment and handling.

With this object in view, my invention consists in a packing-ring for slip-joint pipe connections characterized by being substantially concavo-convex in cross-section, whereby it may yield to endwise pressure.

In the accompanying drawings:

Fig. 1 is a view partly in elevation and partly in longitudinal section of a pipe and fitting, together with a slip-joint provided with one of my improved packing-rings, the packing-ring being compressed in place;

Fig. 2 is a corresponding view with the parts separated prior to assembly;

Fig. 3 is a longitudinal sectional view showing the parts in the positions due to them just prior to the compression of my improved packing-ring;

Fig. 4 is a top or plan view of my improved packing-ring; and

Fig. 5 is a view thereof mainly in side elevation and partly in section.

In carrying out my invention as herein shown, I form a packing-ring 10 of soft brass or other suitable metal and provide the same at one end with a sloping annular face 11 and at its opposite end with a slightly rounded face 12, as clearly shown in Fig. 5. About midway between its opposite ends I form the said ring with an internal annular groove 13, the purpose of which will hereinafter appear, and which results in the formation of an inwardly-extending bearing-flange 14 at the lower end of the said ring and a substantially corresponding complementary bearing-flange 15 at its upper end.

In the use of my improved packing-ring, it is slipped over a pipe 16 for the purpose of connecting the latter to a fitting 17. The fitting just mentioned is, as shown, formed at its lower end with external threads 18 for co-action with the internal threads of a binding-nut 19 which has been previously placed upon the pipe 16 before the end of the said pipe has been inserted into the fitting 17, as shown in Fig. 2. The binding-nut 19 is next screwed upon the end of the fitting, so as to lightly grip the packing-ring 10 between an inwardly-turned flange 20 formed upon the said binding-nut, and the inwardly-sloping rounded end 21 of the fitting 17 aforesaid; the parts now being in the positions shown in Fig. 3.

After the pipe 16 has been adjusted longitudinally within the fitting 17 to the desired degree, the binding-nut 19 is screwed further onto the end of the fitting with the effect of compressing the packing-ring endwise between the parts 20 and 21 and, at the same time, causing its flanges 14 and 15 to yield inwardly against the exterior of the pipe 16 and its central portion to yield outward, as shown in Fig. 1. This compression of the ring 10, as just described, is permitted and facilitated by its internal groove 13, which as shown is of greater diameter than the internal diameter of the fitting 17 and the flange 20, and causes the flange 15, and, to a somewhat lesser degree, the flange 14, to firmly grip the exterior of the pipe 16 and effectually prevent the leakage of fluid between the said pipe and fitting.

I claim:

A metallic packing-ring formed at one end with an annular tapered external compression-surface; a narrow annular internal bearing-surface at the same end of the ring as the said tapered compression-surface and extending substantially parallel with the axis of the ring; and an internal annular groove of a depth equal to substantially half the total radial thickness of the ring and having one end closely approaching the said tapered compression-surface to create a weakened annular bending-zone and its opposite end sufficiently removed from the other end of the ring to preserve the same unweakened; whereby when endwise pressure is applied to the ring, the same will bow outward at the said bending-zone and permit the said annular bearing-surface to remain substantially parallel with a tube upon which it is applied.

In testimony whereof, I have signed this specification.

ADOLPH C. RECKER.